(12) United States Patent
Nakagawa et al.

(10) Patent No.: US 11,213,757 B2
(45) Date of Patent: Jan. 4, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Takaaki Nakagawa, Kanagawa (JP); Hiromasa Doi, Kanagawa (JP); Hirotake Goto, Kanagawa (JP); Takahisa Fujita, Kanagawa (JP); Sumio Okada, Saitama (JP); Keita Ishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/069,695

(22) PCT Filed: Mar. 24, 2017

(86) PCT No.: PCT/JP2017/011921
§ 371 (c)(1),
(2) Date: Jul. 12, 2018

(87) PCT Pub. No.: WO2017/175599
PCT Pub. Date: Oct. 12, 2017

(65) Prior Publication Data
US 2019/0009178 A1 Jan. 10, 2019

(30) Foreign Application Priority Data
Apr. 8, 2016 (JP) .............................. JP2016-077752

(51) Int. Cl.
*A63F 9/24* (2006.01)
*A63F 13/00* (2014.01)
(Continued)

(52) U.S. Cl.
CPC .............. *A63F 13/86* (2014.09); *A63F 13/35* (2014.09); *H04N 21/234* (2013.01);
(Continued)

(58) Field of Classification Search
CPC .................................. A63F 13/00; H04N 1/00
See application file for complete search history.

(56) References Cited

U.S. PATENT DOCUMENTS

2006/0058103 A1* 3/2006 Danieli .................... A63F 13/12
463/42
2008/0015003 A1* 1/2008 Walker ..................... A63F 13/10
463/1
(Continued)

FOREIGN PATENT DOCUMENTS

JP 2000-061145 A 2/2000
JP 2009-536406 A 10/2009
(Continued)

*Primary Examiner* — Milap Shah
*Assistant Examiner* — Jason Pinheiro
(74) *Attorney, Agent, or Firm* — Paratus Law Group, PLLC

(57) ABSTRACT

The present disclosure relates to an information processing apparatus, an information processing method, and a program making it possible to further enhance entertainability. A play state recognition unit recognizes a play state of a game. The effect rendering unit performs image processing for adding an effect to an image representing the state of the commentator that makes a gaming commentary on the basis of the play state of the game recognized by the play state recognition unit. For example, a game status indicating predetermined information is displayed at a predetermined location on the game screen of the game in accordance with the play state of the game. The play state recognition unit analyzes the game status to recognize the play state of the game. The present technology can be applied to a video distribution service that distributes a video of a game screen, for example.

16 Claims, 10 Drawing Sheets

(51) Int. Cl.
*G06F 17/00* (2019.01)
*A63F 13/86* (2014.01)
*A63F 13/35* (2014.01)
*H04N 21/472* (2011.01)
*H04N 21/234* (2011.01)
*H04N 21/24* (2011.01)
*H04N 21/431* (2011.01)
*H04N 21/478* (2011.01)
*H04N 21/81* (2011.01)
*A63F 13/87* (2014.01)
*A63F 13/497* (2014.01)
*A63F 13/65* (2014.01)

(52) U.S. Cl.
CPC ....... *H04N 21/23418* (2013.01); *H04N 21/24* (2013.01); *H04N 21/4318* (2013.01); *H04N 21/4781* (2013.01); *H04N 21/47202* (2013.01); *H04N 21/8173* (2013.01); *A63F 13/497* (2014.09); *A63F 13/65* (2014.09); *A63F 13/87* (2014.09)

(56) References Cited

U.S. PATENT DOCUMENTS

| | | | | |
|---|---|---|---|---|
| 2008/0070655 | A1* | 3/2008 | Tanabe | A63F 13/10 463/7 |
| 2009/0286604 | A1* | 11/2009 | Clowes | A63F 13/12 463/42 |
| 2015/0227735 | A1* | 8/2015 | Chappell | G06F 3/013 726/19 |
| 2016/0104385 | A1* | 4/2016 | Alam | G09B 5/00 434/236 |
| 2016/0314674 | A1* | 10/2016 | He | G06F 3/012 |
| 2016/0322078 | A1* | 11/2016 | Bose | A63F 13/217 |
| 2017/0006322 | A1* | 1/2017 | Dury | H04N 21/254 |

FOREIGN PATENT DOCUMENTS

| | | |
|---|---|---|
| JP | 2012-252516 A | 12/2012 |
| JP | 2015-016104 A | 1/2015 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/011921 (filed on Mar. 24, 2017) under 35 U.S.C. § 371, which claims priority to Japanese Patent Application No. 2016-077752 (filed on Apr. 8, 2016), which are all hereby incorporated by reference in their entirety.

TECHNICAL FIELD

The present disclosure relates to an information processing apparatus, an information processing method, and a program, and more particularly relates to an information processing apparatus, an information processing method, and a program capable of enhancing entertainability.

BACKGROUND ART

There is a conventional video distribution service in which a player of a game distributes a video of a game screen (already played video, real time video during playing, etc.). Such a video distribution service is referred to as a gaming commentary, in which a player who makes a commentary while playing a game (hereinafter also referred to as a gaming commentator or just commentator as appropriate) can enjoy the game together with a viewer of the video.

For example, Patent Document 1 discloses a content providing method of evaluating a game play on the basis of set evaluation criteria and distributing a game play commentary image satisfying the evaluation criteria to client terminals.

CITATION LIST

Patent Document

Patent Document 1: Japanese Patent Application Laid-Open No. 2015-16104

SUMMARY OF THE INVENTION

Problems to be Solved by the Invention

Moreover, there is a type of gaming commentary that has been popular in recent years that not merely distributes a video of a game screen but also distributes a video obtained by combining a picture in which a commentator is playing a game onto a portion of the game screen, aiming to enable providing enjoyable game screen with reactions of the commentator. For example, for the purpose of transmitting the state of the game to the viewer, the commentator gives overreacting expression or voice with the state of the game, so as to provide gaming commentary with high entertainability.

In such a gaming commentary, there is a demand for providing a function capable of enhancing the entertainability in order to increase the satisfaction of commentators and viewers.

The present disclosure has been made in view of such a situation, and aims to further enhance the entertainability.

Solutions to Problems

An information processing apparatus according to an aspect of the present disclosure includes: a play state recognition unit that recognizes a play state of a game; and an effect rendering unit that performs image processing of adding an effect to an image representing a state of a commentator that makes a gaming commentary of the game, on the basis of the play state of the game recognized by the play state recognition unit.

An information processing method or a program according to an aspect of the present disclosure includes steps of: recognizing a play state of a game; and performing image processing of adding an effect to an image representing a state of a commentator that makes a gaming commentary of the game, on the basis of the recognized play state of the game.

According to an aspect of the present disclosure, a play state of a game is recognized and image processing of adding an effect to an image representing the state of the gaming commentator that makes a gaming commentary of the game is performed on the basis of the recognized play state of the game.

Effects of the Invention

According to an aspect of the present disclosure, it is possible to enhance entertainability.

MODE FOR CARRYING OUT THE INVENTION

Hereinafter, specific embodiments of the present technology will be described in detail with reference to the drawings.

Figure 1:
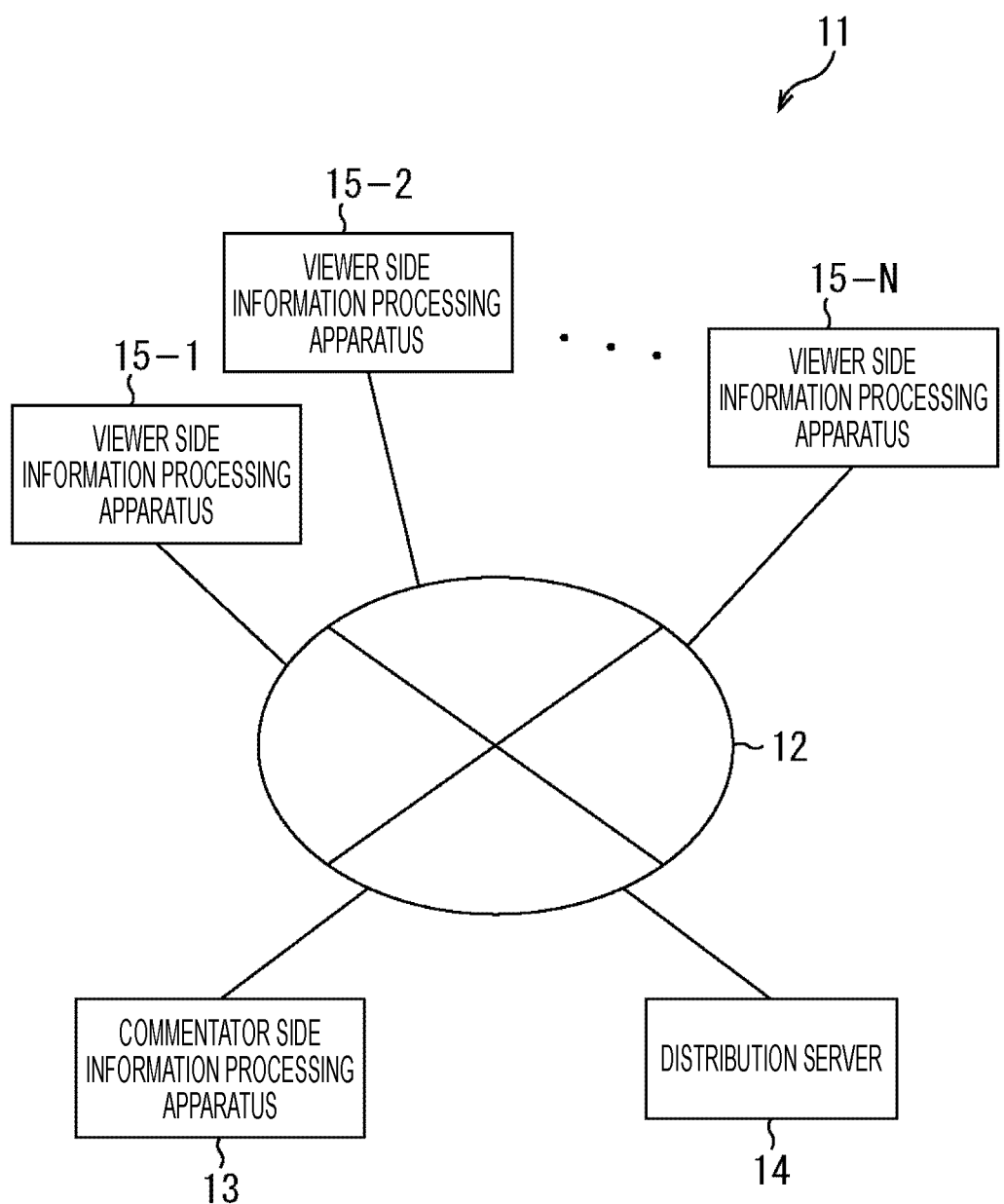
FIG. 1 is a block diagram illustrating an exemplary configuration of a video distribution system according to an embodiment of the present technology.

FIG. 1 is a block diagram illustrating an exemplary configuration of a video distribution system according to an embodiment of the present technology.

As illustrated in FIG. 1, a video distribution system 11 is connected to a commentator side information processing apparatus 13, a distribution server 14, and N (a plurality of)

viewer side information processing apparatuses 15-1 to 15-N are mutually connected via a network 12 such as the Internet.

The commentator side information processing apparatus 13 captures a game screen of a game that the commentator makes a commentary in real time while playing, and transmits a video obtained by combining a portion of the game screen with a commentator screen on which an image representing the state of the commentator playing the game is displayed (hereinafter referred to as a gaming commentary video as appropriate) to the distribution server 14.

The distribution server 14 analyzes the game screen of the gaming commentary video transmitted from the commentator side information processing apparatus 13 so as to recognize the play state of the game. Then, the distribution server 14 performs image processing of adding an effect to the commentator displayed on the commentator screen of the gaming commentary video, on the basis of the recognized play state of the game. Here, an example of the effect to be added to the commentator is an effect image effectively represents expression of the gaming commentator or expression of various influences the characters played by the commentator received in the game. With this configuration, the distribution server 14 transmits a video (hereinafter referred to as a distribution gaming commentary video as appropriate) obtained by applying such image processing to the viewer side information processing apparatuses 15-1 to 15-N via the network 12.

Each of the viewer side information processing apparatuses 15-1 to 15-N displays a distribution gaming commentary video distributed from the distribution server 14 via the network 12 so as to be viewed by individual users. Note that the information viewer side processing apparatuses 15-1 to 15-N each have a similar configuration. Hereinafter, therefore, in a case where there is no need to distinguish between these, each will be simply referred to as the viewer side information processing apparatus 15.

The video distribution system 11 configured as described above distributes a distribution gaming commentary video in which the effect based on the recognition result of the play content of the game has been added to the gaming commentator, leading to enhanced entertainability.

Here, with reference to FIG. 2, the video distribution service provided by the video distribution system 11 will be described.

Figure 2:
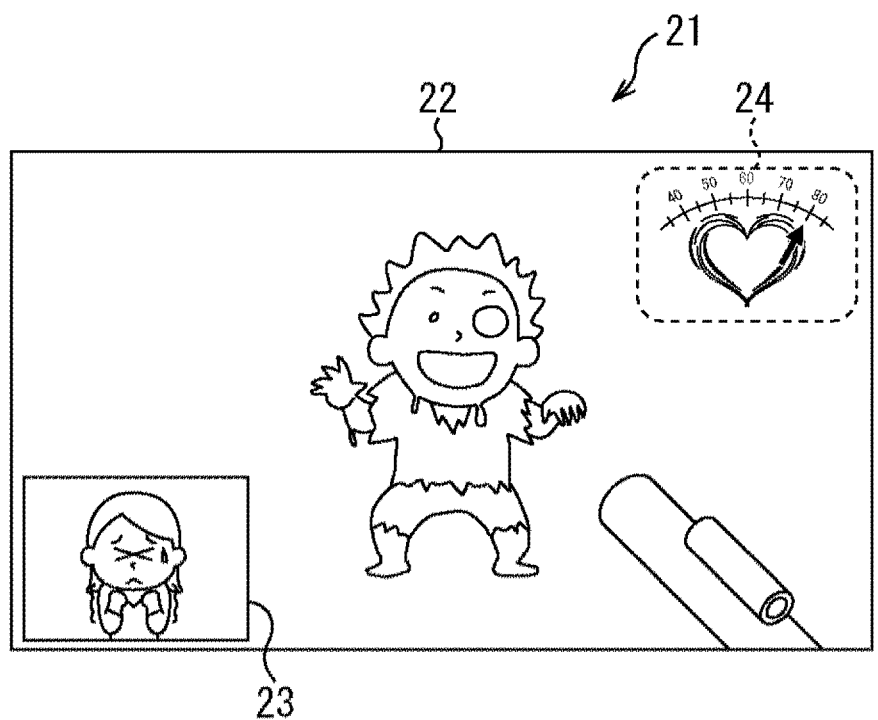
FIG. 2 is a diagram illustrating a video distribution service provided by a video distribution system.
Figure 2:
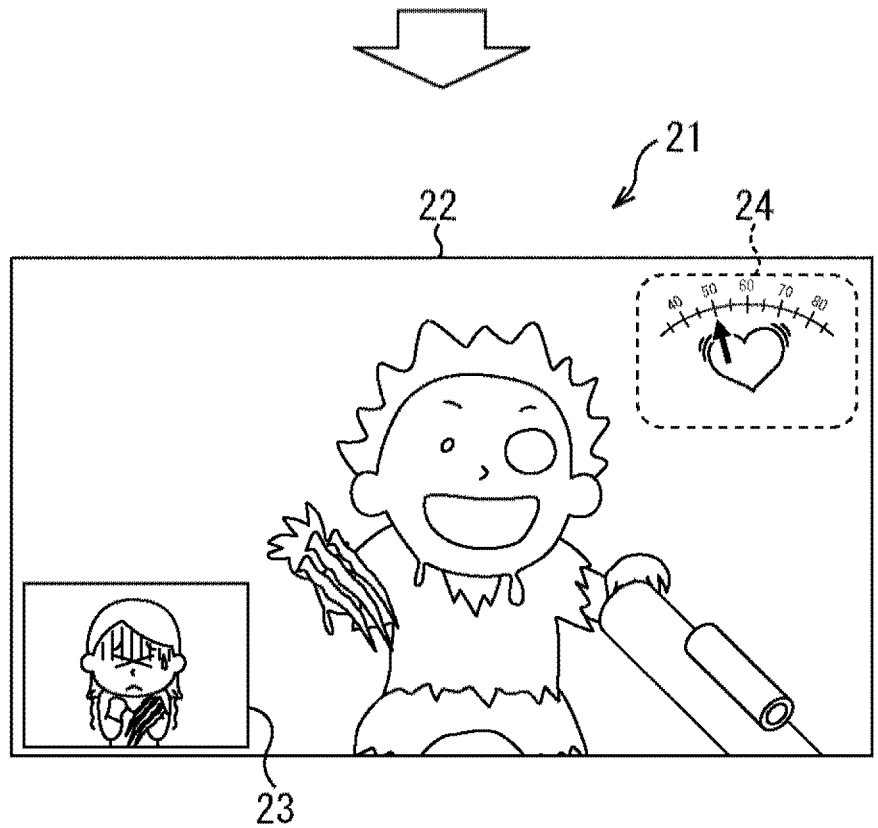

For example, a distribution gaming commentary video as illustrated in FIG. 2 is displayed on a display unit of the commentator side information processing apparatus 13 and the viewer side information processing apparatus 15.

The distribution gaming commentary video 21 displays on its entire space a game screen 22 during play of the game for which the commentator using the commentator side information processing apparatus 13 makes a commentary while playing. In this, a commentator screen 23 is displayed over a portion of the game screen 22 (lower left in the example of FIG. 2).

The commentator screen 23 displays a video obtained by capturing the state of the commentator playing the game. Note that the commentator screen 23 may display a video representing the state of the commentator by avatar rendered by computer graphics as a virtual self image of the commentator. For example, with imaging of the commentator by the imaging apparatus provided in the commentator side information processing apparatus 13, with recognition of expressions, motions, or the like of the commentator and generation of an avatar by computer graphics on the basis of the recognition result, it is possible to generate a video in which an expression, motion, or the like of the commentator is reflected on the avatar.

In addition, the game screen 22 displays a game status 24 indicating a variety of information in accordance with the play state of the game. In the example of FIG. 2, a life gauge being an image graphically expressing numerical values (parameters) representing the physical strength or the like of a character in the game played by the commentator is displayed as the game status 24 on the upper right of the game screen 22.

As described above, the video distribution system 11 transmits the gaming commentary video obtained by combining the commentator screen 23 over a portion of the game screen 22 from the commentator side information processing apparatus 13 to the distribution server 14. Then, the distribution server 14 analyzes the information indicated in the game status 24 of the game screen 22 so as to recognize the play state of the game. With this configuration, image processing of adding an effect based on the recognition result to the commentator screen 23 is performed, and then, the distribution gaming commentary video 21 obtained by combining the commentator screen 23 that has undergone this image processing over a portion of the game screen 22 is distributed from the distribution server 14.

For example, the distribution gaming commentary video 21 illustrated on the upper side of FIG. 2 displays a play state before the character in the game played by the commentator suffers damage. Then, when the character suffers damage, a life gauge of the game status 24 decreases in accordance with the damage suffered by the character, as indicated by the game status 24 of the distribution gaming commentary video 21 illustrated on the lower side of FIG. 2.

Accordingly, when the distribution server 14 recognizes that the life gauge illustrated in the game status 24 has decreased, an effect of giving pale complexion is given to the commentator as illustrated in the commentator screen 23 of the distribution gaming commentary video 21 illustrated in the lower side of FIG. 2. Furthermore, when the distribution server 14 recognizes that an effect demonstrating that the character in the game has suffered damage is displayed on the game screen 22, an effect similar to the effect is added to the commentator as illustrated in the commentator screen 23.

In this manner, the video distribution system 11 distributes the distribution gaming commentary video 21 to which the effect corresponding to the play state of the game is added to the commentator, making it possible to provide a video distribution service having higher entertainability. For example, the distribution gaming commentary video 21 adds an effect corresponding to the play state of the game to the commentator, leading to elimination of necessity on the commentator to give overreacting expression or voice with the state of the game. As a result, the commentator can concentrate on playing the game, and the viewer can recognize the play state of the game by the effect. As a result, the video distribution system 11 makes it possible to enhance the entertainability.

Figure 3:
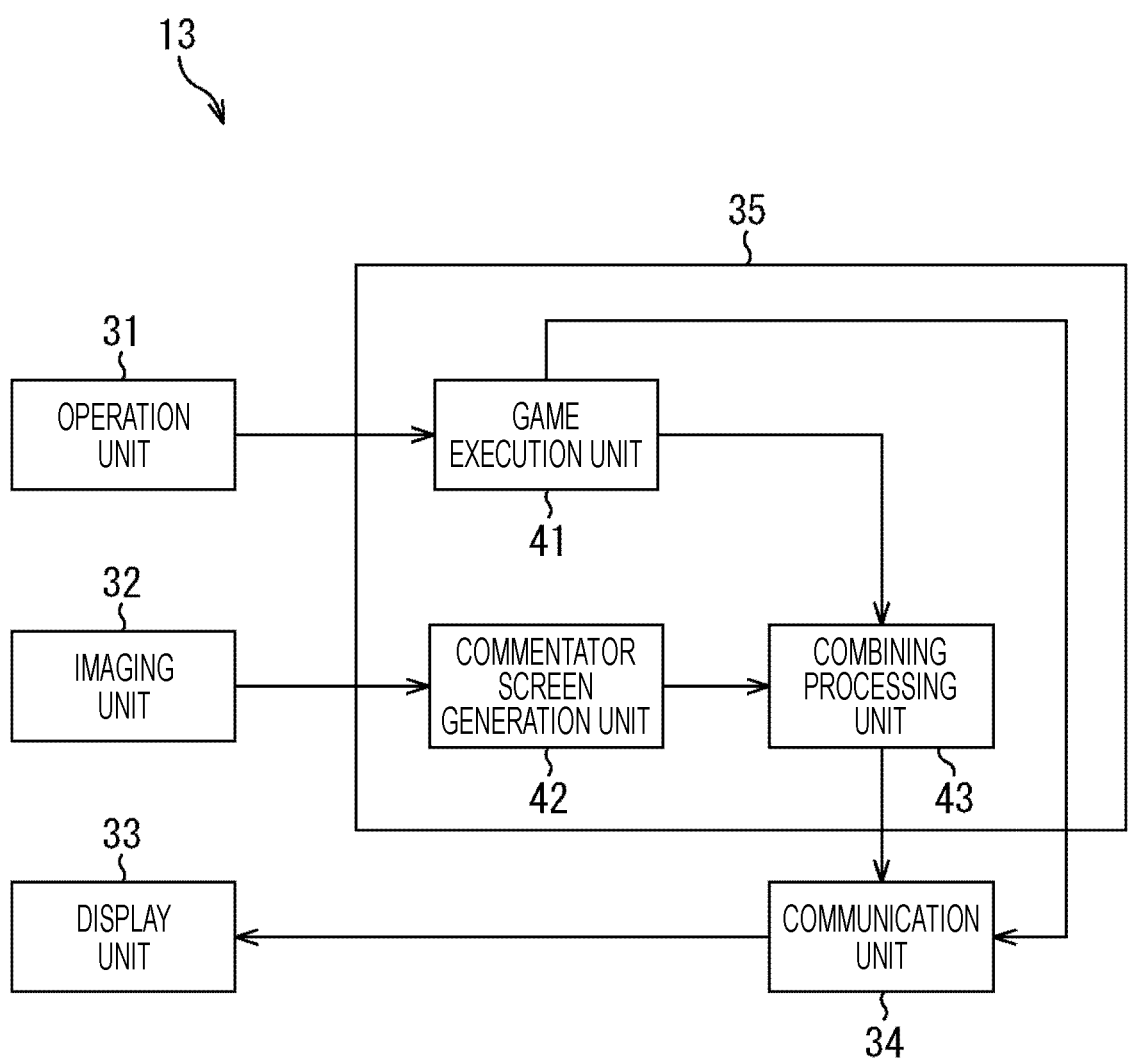
FIG. 3 is a block diagram illustrating an exemplary configuration of a commentator side information processing apparatus.

Next, FIG. 3 is a block diagram illustrating an exemplary configuration of the commentator side information processing apparatus 13 in FIG. 1.

As illustrated in FIG. 3, the commentator side information processing apparatus 13 includes an operation unit 31, an imaging unit 32, a display unit 33, a communication unit 34, and a gaming commentary processing unit 35.

The operation unit 31 is formed with, for example, various buttons, a touch screen, or the like, accepts gaming operation by the commentator, and supplies operation information indicating the content of the operation to the gaming commentary processing unit 35.

The imaging unit 32 includes, for example, a complementary metal oxide semiconductor (CMOS) image sensor and the like, captures an image of a commentator playing a game by the commentator side information processing apparatus 13, and supplies the video including the image of the commentator to the gaming commentary processing unit 35.

The display unit 33 includes, for example, a liquid crystal display, an organic electroluminescence (EL) display, or the like, and displays a distribution gaming commentary video 21 distributed from the distribution server 14. Note that the display unit 33 may display in the distribution server 14 the gaming commentary video before the image processing is performed, the game screen before the commentator screen is combined over the gaming commentary video, or the like.

The communication unit 34, for example, can perform communication conforming to a predetermined communication standard such as the Internet, and communicates with the distribution server 14 via the network 12 in FIG. 1. For example, the communication unit 34 transmits the gaming commentary video output from the gaming commentary processing unit 35 to the distribution server 14, receives the distribution gaming commentary video 21 distributed from the distribution server 14, and supplies it to the display unit 33.

The gaming commentary processing unit 35 includes a game execution unit 41, a commentator screen generation unit 42, and a combining processing unit 43.

The game execution unit 41 can execute various games such as a game provided by a disc and a game downloaded via the communication unit 34. Then, the game execution unit 41 executes the game in accordance with operation information supplied from the operation unit 31, and supplies the game screen 22 to the combining processing unit 43. In addition, in a case where the game execution unit 41 has a function of outputting game information associated with the play content of the game being executed (for example, the numerical value of the life gauge as described above, an item acquired in the game, an experience point, and the like), the game execution unit 41 can transmit this game information to the distribution server 14 via the communication unit 34.

The commentator screen generation unit 42 generates the commentator screen 23 displaying the state of the commentator on the basis of the video supplied from the imaging unit 32. For example, the commentator screen generation unit 42 recognizes expressions, motions, or the like of the commentator displayed in a video supplied from the imaging unit 32, and performs image processing of generating an avatar by computer graphics on the basis of the recognition result. This enables the commentator screen generation unit 42 to reflect the expression, motion, or the like of the commentator to the avatar, and can generate the commentator screen 23 in which the avatar is displayed.

The combining processing unit 43 performs combining processing of combining the commentator screen 23 supplied from the commentator screen generation unit 42 over a portion of the game screen 22 supplied from the game execution unit 41. With this configuration, the combining processing unit 43 generates a gaming commentary video in which the game screen 22 is displayed on the entire screen and the commentator screen 23 is displayed on a portion of the game screen 22. Then, the combining processing unit 43 supplies the generated gaming commentary video to the communication unit 34, and controls to transmit the generated image to the distribution server 14.

The commentator side information processing apparatus 13 is configured in this manner, making it possible to generate a gaming commentary video in which the commentator screen 23 is combined over a portion of the game screen 22 and transmit the generated image to the distribution server 14.

Figure 4:
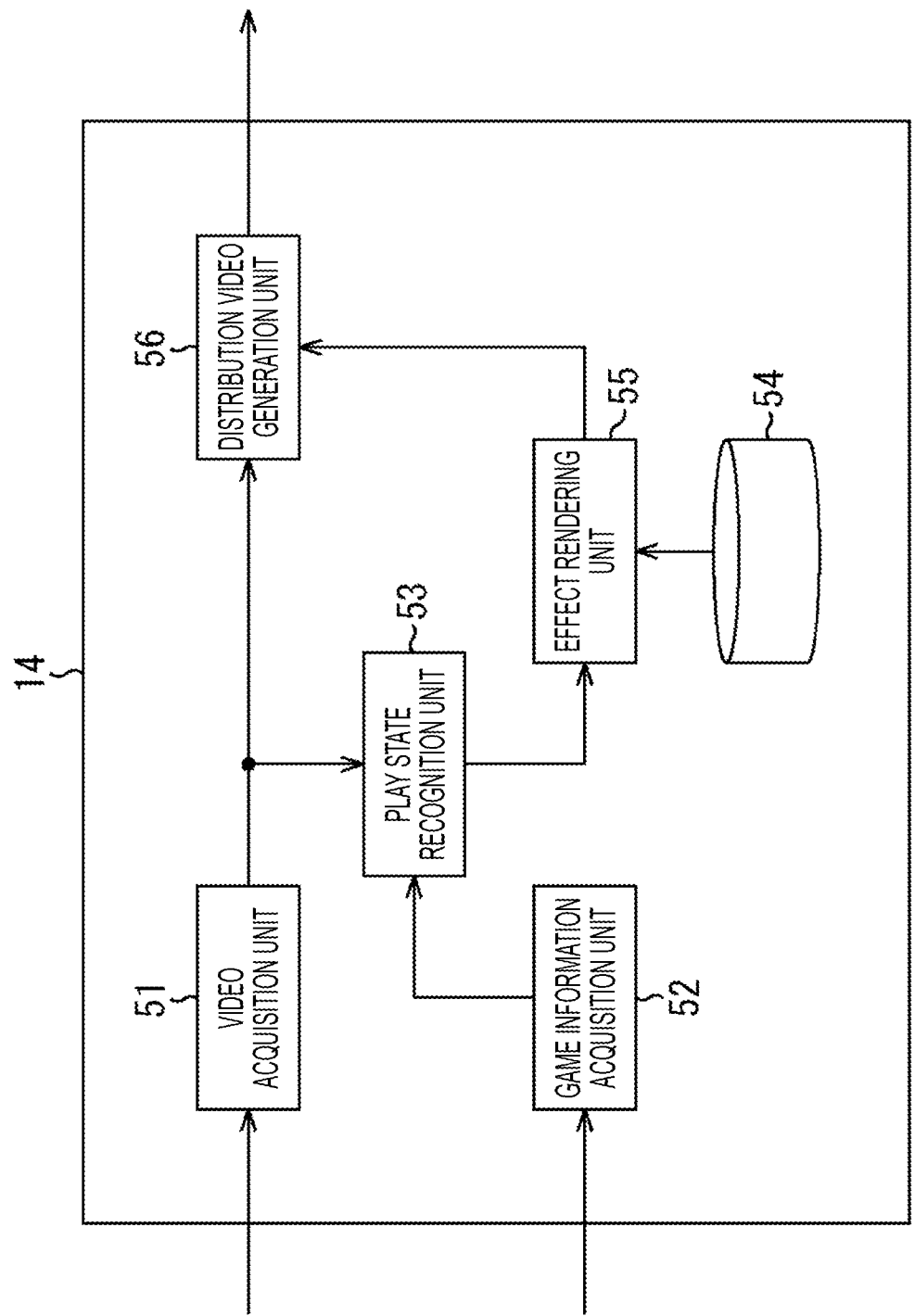
FIG. 4 is a block diagram illustrating an exemplary configuration of a distribution server.

Next, FIG. 4 is a block diagram illustrating an exemplary configuration of the distribution server 14 in FIG. 1.

As illustrated in FIG. 4, the distribution server 14 includes a video acquisition unit 51, a game information acquisition unit 52, a play state recognition unit 53, a storage unit 54, an effect rendering unit 55, and a distribution video generation unit 56. In addition, the distribution server 14 includes a communication unit (not illustrated) that makes it possible to communicate with the commentator side information processing apparatus 13 and the viewer side information processing apparatus 15 via the network 12 in FIG. 1.

The video acquisition unit 51 obtains the gaming commentary video that is transmitted from the commentator side information processing apparatus 13 via the network 12, and supplies the obtained image to the play state recognition unit 53 and the distribution video generation unit 56.

As described above, in a case where the game execution unit 41 of the commentator side information processing apparatus 13 has the function of outputting the game information associated with the play state of the game, the game information acquisition unit 52 obtains the game information via the network 12 and supplies it to the play state recognition unit 53. Note that in a case where the game execution unit 41 of the commentator side information processing apparatus 13 does not include the function of outputting the game information, the distribution server 14 may have a configuration in which the game information acquisition unit 52 is omitted.

The play state recognition unit 53 recognizes the play state of the game during commentary by the commentator on the commentator side information processing apparatus 13. For example, the play state recognition unit 53 performs image analysis on the game screen 22 of the gaming commentary video supplied from the video acquisition unit 51, and recognizes the play state of the game in accordance with an analysis result. For example, the play state recognition unit 53 analyzes the content indicated by the game status 24 on the game screen 22 and performs analysis based on the effect displayed on the game screen 22, so as to recognize the play state of the game. Note that in a case where the game information is supplied from the game information acquisition unit 52, the play state recognition unit 53 can recognize the play state on the basis of game information as well as image analysis toward the game screen 22. Then, the play content recognition unit 53 supplies the recognized play state to the effect rendering unit 55.

The storage unit 54 stores various types of data for displaying the effect to be added to the commentator on the commentator screen 23 by the effect rendering unit 55.

The effect rendering unit 55 reads, from the storage unit 54, data of the effect to be added to the commentator on the commentator screen 23, on the basis of the play state supplied from the play state recognition unit 53. Then, the effect rendering unit 55 performs image processing of rendering the read effects to be appropriately superimposed on the commentator, for example, image processing of rendering deformation effect in accordance with the orientation of the face of the commentator and the like, and supplies the image to the distribution video generation unit 56.

The distribution video generation unit 56 performs image processing of combining the effect supplied from the effect rendering unit 55 to the commentator on the commentator screen 23 of the gaming commentary video supplied from the video acquisition unit 51. With this configuration, the distribution video generation unit 56 generates the distribution gaming commentary video 21 to which the effect is added on the commentator screen 23. Then, the distribution video generation unit 56 distributes the generated distribution gaming commentary video 21 to the commentator side information processing apparatus 13 and the viewer side information processing apparatus 15 via a communication unit (not illustrated).

The distribution server 14 is configured in this manner, making it possible to generate the distribution gaming commentary video 21 to which the effect is added to the commentator (real video or avatar) of the commentator screen 23, and to distribute the generated video to the commentator side information processing apparatus 13 and the viewer side information processing apparatus 15.

Next, with reference to FIGS. 5 to 8, an example of the distribution gaming commentary video 21 distributed in the video distribution system 11 will be described.

Figure 5:
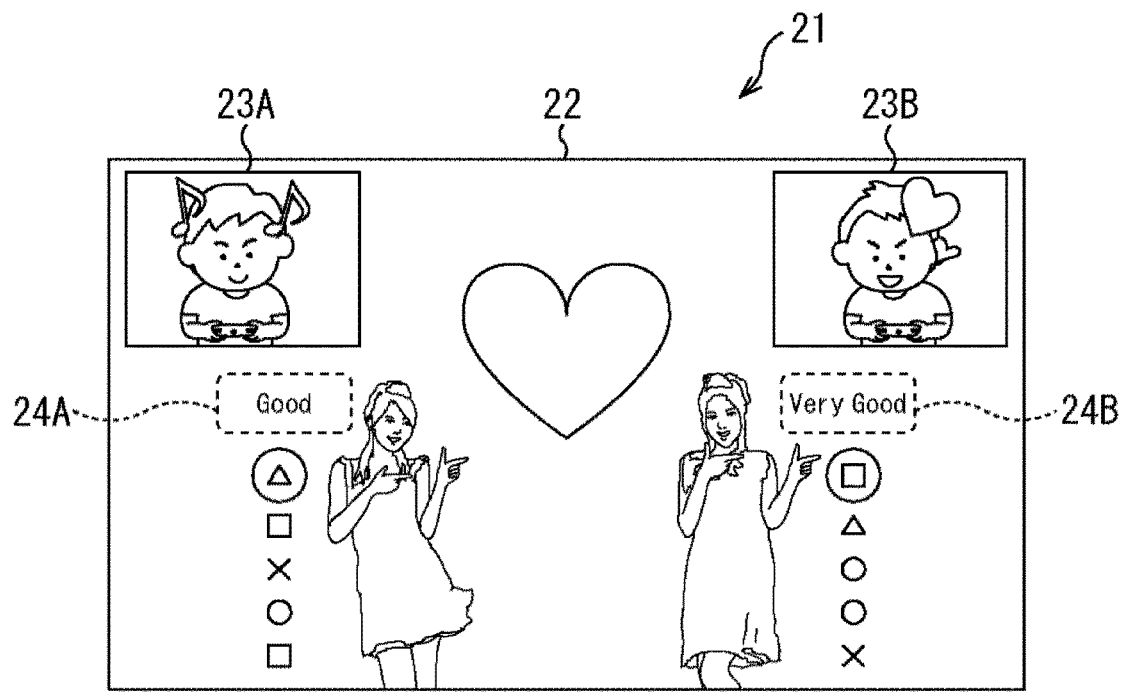
FIG. 5 is a diagram illustrating an example of a distribution gaming commentary video.

FIG. 5 illustrates an example of the distribution gaming commentary video 21 of a rhythm game in which a character dances along operation by the commentator with a rhythm.

For example, in a rhythm game, a word indicating a matching extent of operation timing performed in accordance with the progress of the music played in the game with the rhythm is displayed at a specific location. As illustrated in FIG. 5, for example, in a case where the operation timing matches the rhythm, an image representing the text "Very Good" is displayed, and in a case where the operation timing is slightly off the rhythm, then "Good" is displayed.

In the video distribution system 11, the play state recognition unit 53 of the distribution server 14 performs image analysis of the word displayed at the specific location as the game status 24, enabling recognition of the play status of the game. Then, the play state recognition unit 53 supplies the play state recognized on the basis of the total display count of "Very Good" and "Good" displayed on the game status 24, the number of consecutive numbers, or the like, to the effect rendering unit 55.

For example, in a case where the display count of "Very Good" displayed on the game statuses 24A and 24B continues for the predetermined counts or more, the play state recognition unit 53 recognizes that the play state is a state where the commentator is playing perfectly to the rhythm. Accordingly, on the basis of the play states recognized from each of the game statuses 24A and 24B, the effect rendering unit 55 adds an effect of enlivening the play with the rhythm to each of the commentators displayed on each of the commentator screens 23A and 23B, respectively.

In this manner, the video distribution system 11 is capable of, in the rhythm game, distributing a distribution gaming commentary video 21 to which an effect of enlivening the play of the commentator has been added in accordance with the extent to which the operation timing matches the rhythm.

Figure 6:
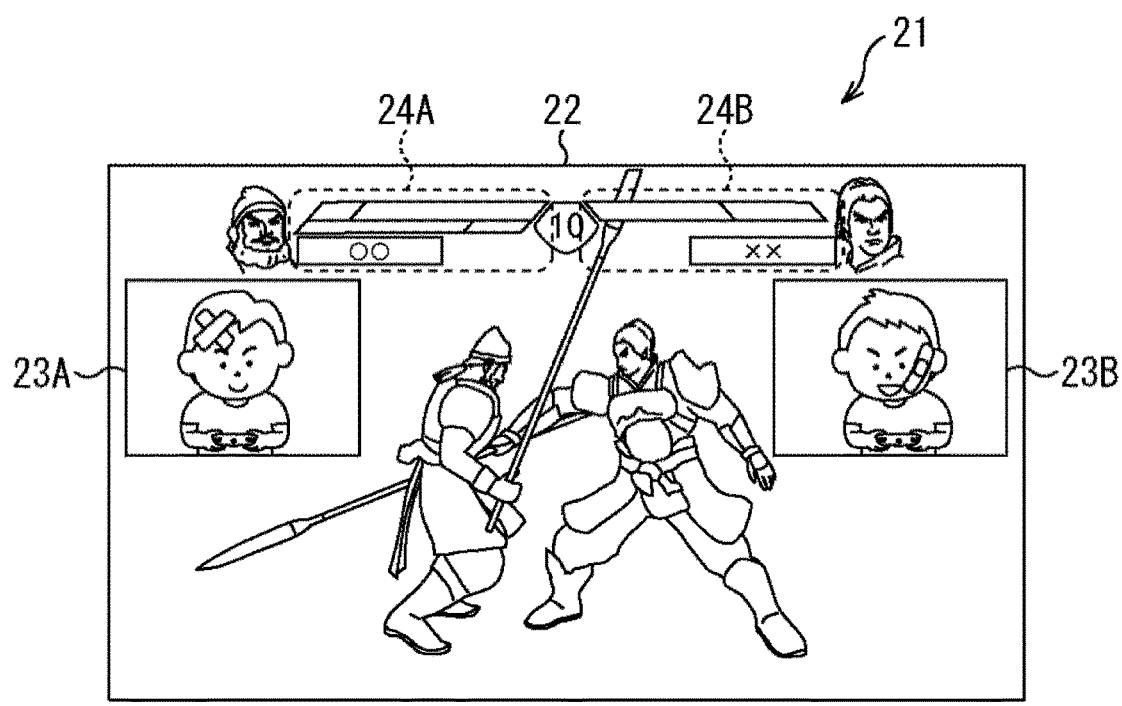
FIG. 6 is a diagram illustrating an example of a distribution gaming commentary video.

FIG. 6 illustrates an example of the distribution gaming commentary video 21 of a fighting game in which two characters fight each other in accordance with the operation of the commentators.

For example, in a fighting game, a life gauge (for example, a parameter representing physical strength) of each of the characters is displayed at a predetermined location. In the video distribution system 11, the play state recognition unit 53 of the distribution server 14 performs image analysis with the life gauge displayed at the specific location as the game status 24, enabling recognition of the play state of the game.

For example, when the life gauge displayed in the game statuses 24A and 24B decreases, the play state recognition unit 53 recognizes that this is a play state in which the character suffers damage. Accordingly, on the basis of the play states recognized from each of the game statuses 24A and 24B, the effect rendering unit 55 adds an effect of indicating suffer of damage in accordance with the damage suffered by the character to each of the commentators displayed on each of the commentator screens 23A and 23B, respectively.

In this manner, the video distribution system 11 is capable of, in the fighting game, distributing a distribution gaming commentary video 21 to which an effect of indicating a state where the commentator suffers damage in accordance with the damage suffered by the character has been added.

Figure 7:
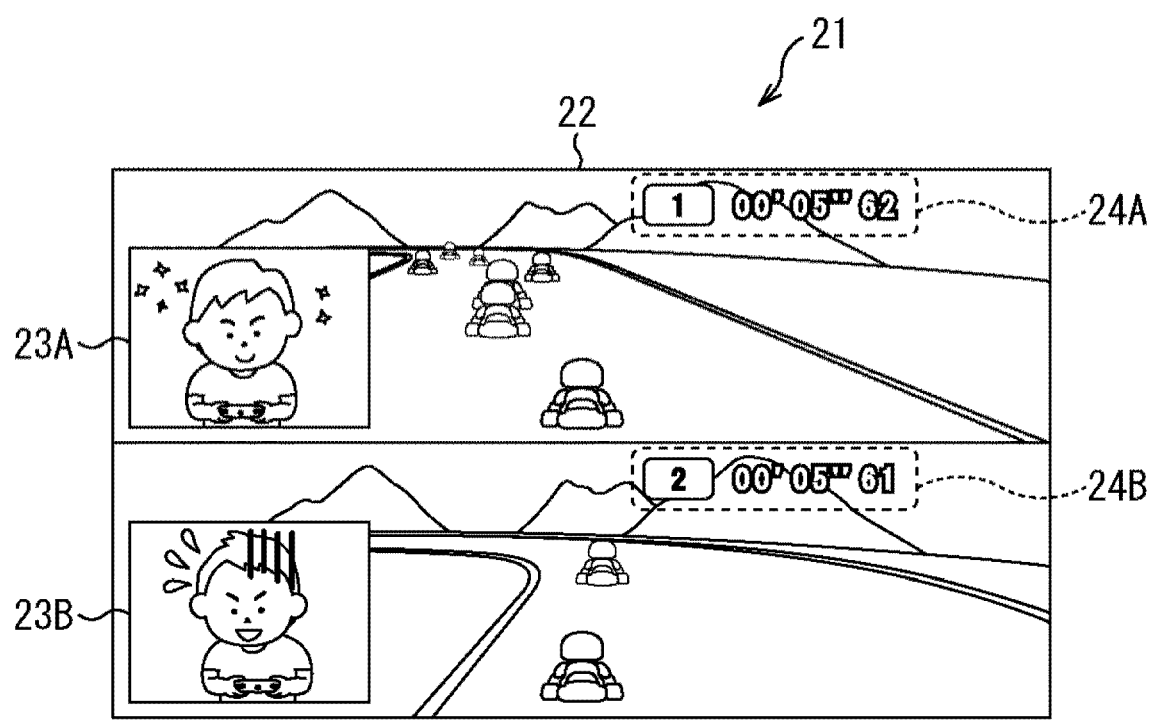
FIG. 7 is a diagram illustrating an example of a distribution gaming commentary video.

FIG. 7 illustrates an example of the distribution gaming commentary video 21 of a racing game in which two characters race each other in accordance with the operation of the commentators.

For example, in a racing game, the ranking, time of individual characters, and the like are displayed at predetermined locations. In the video distribution system 11, the play state recognition unit 53 of the distribution server 14 performs image analysis with the ranking, time, and the like displayed at the specific location as the game status 24, enabling recognition of the play state of the game.

For example, the play state recognition unit 53 recognizes the ranking displayed in the game statuses 24A and 24B as the play state. Accordingly, on the basis of the playing states recognized from the game statuses 24A and 24B, the effect rendering unit 55 adds an effect of expressing emotions (e.g., pleasure to high ranking commentator, and anger to low ranking commentator) in accordance with the ranking of the character to each of the commentators displayed on each of the commentator screens 23A and 23B, respectively. In addition, the play state recognition unit 53 may recognize the time displayed in the game statuses 24A and 24B as the play state, and the effect rendering unit 55 may add an effect of expressing impatience to the low ranking commentator when it is running out of time.

In this manner, the video distribution system 11 is capable of, in the racing game, distributing a distribution gaming commentary video 21 to which an effect of expressing emotion of the commentator in accordance with the ranking of each of the commentators.

Figure 8:
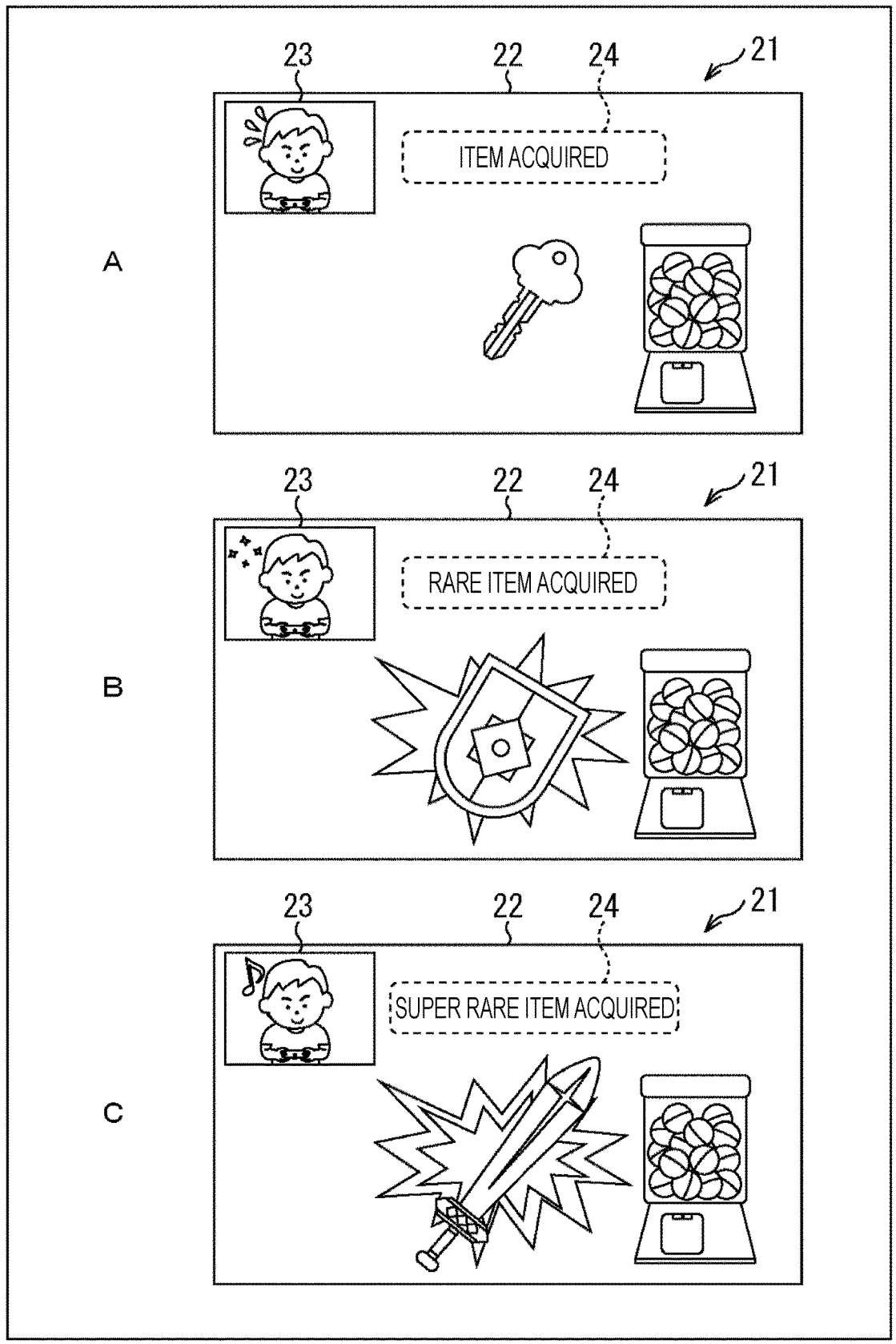
FIG. 8 is a diagram illustrating an example of distribution gaming commentary video.

FIG. 8 illustrates an example of the distribution gaming commentary video 21 at the time of performing an event for acquiring an item in accordance with a predetermined probability in an arbitrary game.

For example, in the event of acquiring an item, a word indicating the value of the item acquired in the event is displayed at a specific location. For example, in a case where an item having normal value is acquired as illustrated in A of FIG. 8, an image representing the text "item acquired" is displayed. In a case where an item having rare value is acquired as illustrated in B of FIG. 8, an image representing the text "rare item acquired" is displayed. Furthermore, for example, in a case where an item having a very high rarity value is acquired as illustrated in C of FIG. 8, an image representing the text "super rare item acquired" is displayed.

In the video distribution system 11, the play state recognition unit 53 of the distribution server 14 performs image analysis of the word displayed at the specific location as the game status 24, enabling recognition of the play status of the game. Then, the play state recognition unit 53 supplies the play state recognized on the basis of the value of the item indicated by the text displayed in the game status 24 to the effect rendering unit 55.

For example, in a case where "item acquired" is displayed as the game status 24, the play state recognition unit 53 recognizes that it is a normal play state, and the effect rendering unit 55 adds a normal effect to the commentator displayed on the commentator screen 23. Moreover, in a case where "rare item acquired" is displayed as the game status 24, the play state recognition unit 53 recognizes that it is a rare play state, and the effect rendering unit 55 adds an effect indicating pleasure to the commentator displayed on the commentator screen 23. Moreover, in a case where "super rare item acquired" is displayed as the game status 24, the play state recognition unit 53 recognizes that it is a very rare play state, and the effect rendering unit 55 adds an effect indicating a great pleasure to the commentator displayed on the commentator screen 23.

Note that in general, a color representing the value of the acquired item is displayed on the background of the game screen 22 (for example, gold color for acquisition of a rare item and silver color for acquisition of very rare item, etc.) , enabling the play state recognition unit 53 to recognize the play state of the game on the basis of the color of the background of the game screen 22 like this.

In this manner, the video distribution system 11 is capable of, in the item acquisition event, distributing a distribution gaming commentary video 21 to which an effect of expressing pleasure of the commentator in accordance with the value of the item acquired by the commentator.

As described with reference to FIGS. 5 to 8, the video distribution system 11 is capable of attaching an effect corresponding to the game status 24 unique to each of the games to the commentator, leading to achieving more entertainability than in the conventional cases.

With reference to the flowchart of FIG. 9, processing executed in the commentator side information processing apparatus 13 will be described.

For example, the processing is started when the commentator performs operation on the commentator side information processing apparatus 13 to start the gaming commentary. In step S11, the game execution unit 41 executes the game in accordance with the operation by the commentator, and supplies the corresponding game screen 22 to the combining processing unit 43.

In step S12, the commentator screen generation unit 42 generates a commentator screen 23 illustrating the state of the commentator on the basis of the video supplied from the imaging unit 32, and supplies the generated screen to the combining processing unit 43.

In step S13, the combining processing unit 43 combines the commentator screen 23 supplied from the commentator screen generation unit 42 in step S12 with a portion of the game screen 22 supplied from the game execution unit 41 in step S11 to generate gaming commentary video. Then, the combining processing unit 43 supplies the generated gaming commentary video to the communication unit 34, and controls to transmit the generated image to the distribution server 14.

In step S14, the game execution unit 41 supplies game information associated with the play state of the game being executed to the communication unit 34 and causes the communication unit 34 to transmit the game information to the distribution server 14.

After the processing of step S14, the processing returns to step S11, and similar processing is repeatedly performed until the operation of finishing the gaming commentary is performed by the commentator.

Figure 10:
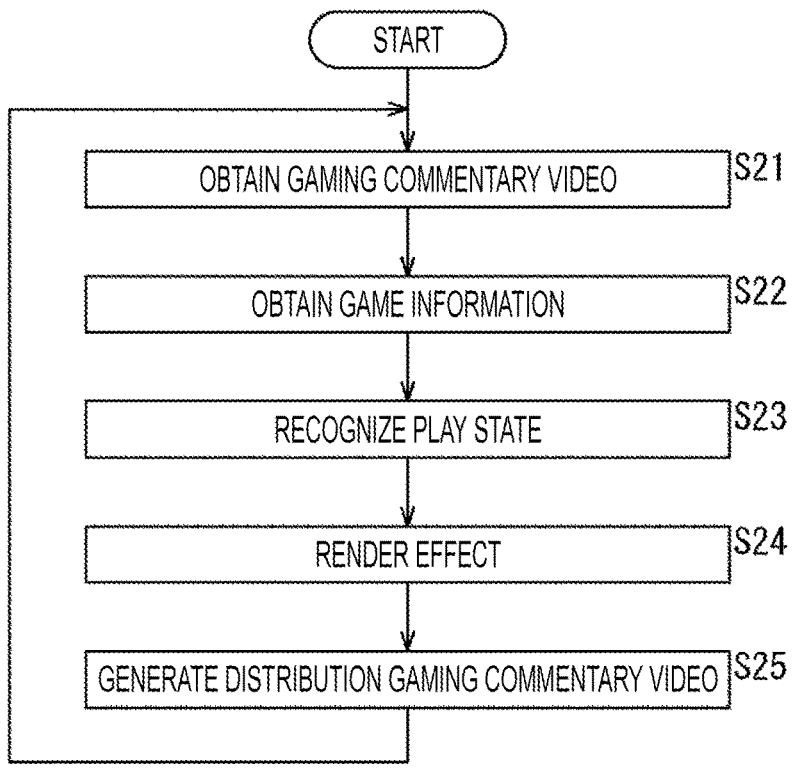
FIG. 10 is a flowchart illustrating processing executed on the distribution server.

With reference to the flowchart of FIG. 10, processing executed in the distribution server 14 will be described.

For example, processing is started by a notification to start the gaming commentary from the commentator side information processing apparatus 13. In step S21, the video acquisition unit 51 obtains gaming commentary video transmitted from the commentator side information processing apparatus 13 in step S13 of FIG. 9. Then, the video acquisition unit 51 supplies the obtained gaming commentary video to the play state recognition unit 53 and the distribution video generation unit 56.

Figure 9:
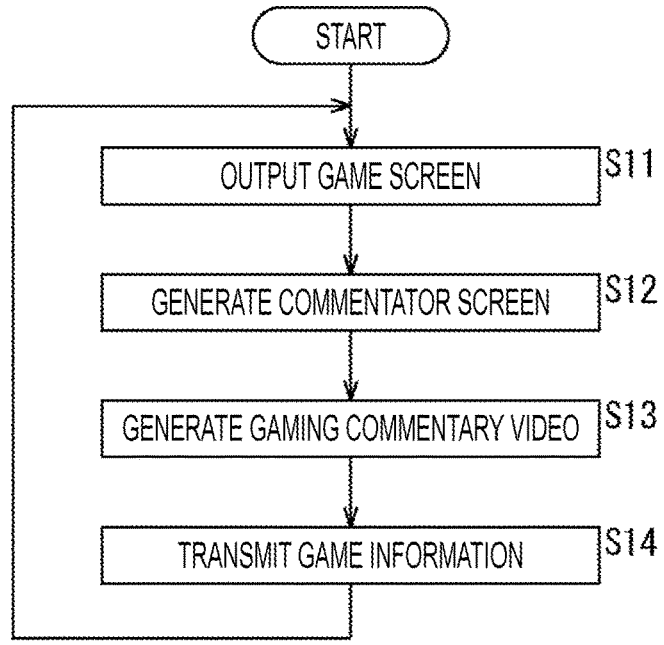
FIG. 9 is a flowchart illustrating processing executed on a gaming commentator side information processing apparatus.

In step S22, the game information acquisition unit 52 obtains the game information transmitted from the commentator side information processing apparatus 13 in step S14 of FIG. 9, and supplies the obtained game information to the play state recognition unit 53.

In step S23, the play state recognition unit 53 recognizes the play state of the game on the basis of the game screen 22 of the gaming commentary video supplied from the video acquisition unit 51 in step S21 and on the basis of the game information supplied from the game information acquisition unit 52 in step S22.

In step S24, the effect rendering unit 55 performs image processing of rendering effects so as to allow the effects based on the play state of the game recognized by the play state recognition unit 53 in step S23 to be appropriately superimposed to the commentator displayed on the commentator screen 23 of the gaming commentary video.

In step S25, the distribution video generation unit 56 performs image processing of combining an effect rendered by the effect rendering unit 55 in step S24 onto the commentator displayed on the commentator screen 23 of the gaming commentary video supplied from the video acquisition. unit 51 in step S21 so as to generate the distribution gaming commentary video 21. Then, the distribution video generation unit 56 distributes the distribution gaming commentary video 21 to the commentator side information processing apparatus 13 and the viewer side information processing apparatus 15.

After the processing in step S25, the processing returns to step S21, and similar processing is repeatedly performed until there is a notification to finish the gaming commentary from the commentator side information processing apparatus 13.

As described above, in the video distribution system 11, the commentator side information processing apparatus 13 outputs the gaming commentary video with the commentator screen 23 combined with a portion of the game screen 22, enabling the distribution server 14 to distribute the distribution gaming commentary video 21 to which effects have been added to the commentator on the commentator screen 23.

With this configuration in the video distribution system 11, the viewer can grasp the game state by the effects added to the commentator on the commentator screen 23 without commentator's overreacting expression or voice. Accordingly, the viewer can enjoy the gaming commentary more than the conventional case, enabling the video distribution system 11 to provide a video distribution service with higher entertainability.

Note that it is also allowable to have the video distribution system 11 in which the commentator side information processing apparatus 13 recognizes the play state and adds the effects to the commentator. In this case, the commentator side information processing apparatus 13 is capable of generating the distribution gaming commentary video 21. Then, it is possible to distribute the distribution gaming commentary video 21 from the commentator side information processing apparatus 13 to the viewer side information processing apparatus 15 via the distribution server 14. That is, the play state recognition unit 53, the effect rendering unit 55, and the distribution video generation unit 56 may be arranged anywhere as long as the location is within the video distribution system 11.

Moreover, as an example of the effect to be added to the commentator on the commentator screen 23, it is allowable to adopt an effect of changing the size of the commentator screen 23 and reduce the size of display of the commentator screen 23 along the decrease of the life gauge. Moreover, it is also allowable to perform image processing using an effect of adding images such as causing the avatar representing the commentator to sweat, to have swollen eyes, to look pale, etc. or deforming the shape of the avatar representing the commentator or displaying friends of the avatar in the background.

In addition, it is also allowable to analyze a video of the commentator and add an effect when there is less reaction in the commentator. Alternatively, it is also allowable to generate effects to be added to the avatar by using biological information of the commentator or by using the state of the game, the motion of the character, or the like, rather than using the video capturing the commentator. Moreover, the commentator can select how to add effects.

Furthermore, in addition to combining the commentator screen 23 over a portion of the game screen 22, it is allowable to have performance to allow the avatar to be displayed on the game screen 22, so as to allow the avatar of the commentator to appear in the game. Then, it is possible to allow interaction by the avatar to be performed onto the character in the game.

Here, the video distribution system 11 is capable of using a reaction by a viewer who is viewing the distribution gaming commentary video 21 by the viewer side information processing apparatus 15 to be reflected to the game being executed on the commentator side information processing apparatus 13, for example. It is allowable, for example, to configure such that when a viewer performs reaction of giving an item to encourage the commentator after an effect indicating a state where the commentator suffers damage, the game character played by the commentator restores from the damage and the effects added to the commentator return to the state before receiving damage. In this manner, with the encouragement from the viewer, it is possible to restore the character of the game played by the commentator.

Note that in addition to distributing videos of games as described above, the video distribution system 11 may also add effects according to scores or the like when distributing videos such as sports or survival games, for example. In addition, the video distribution system 11 can also be used for various services for distributing videos corresponding to the viewpoint of the commentator, for example, a service for distributing videos of cooking.

Moreover, examples of the commentator side information processing apparatus 13 include a personal computer, a stationary game machine, a portable game machine, and a smartphone. Furthermore, the commentator side information processing apparatus 13 may adopt a game system of playing games in a space expressed by virtual reality using a head mounted display.

Figure 11:
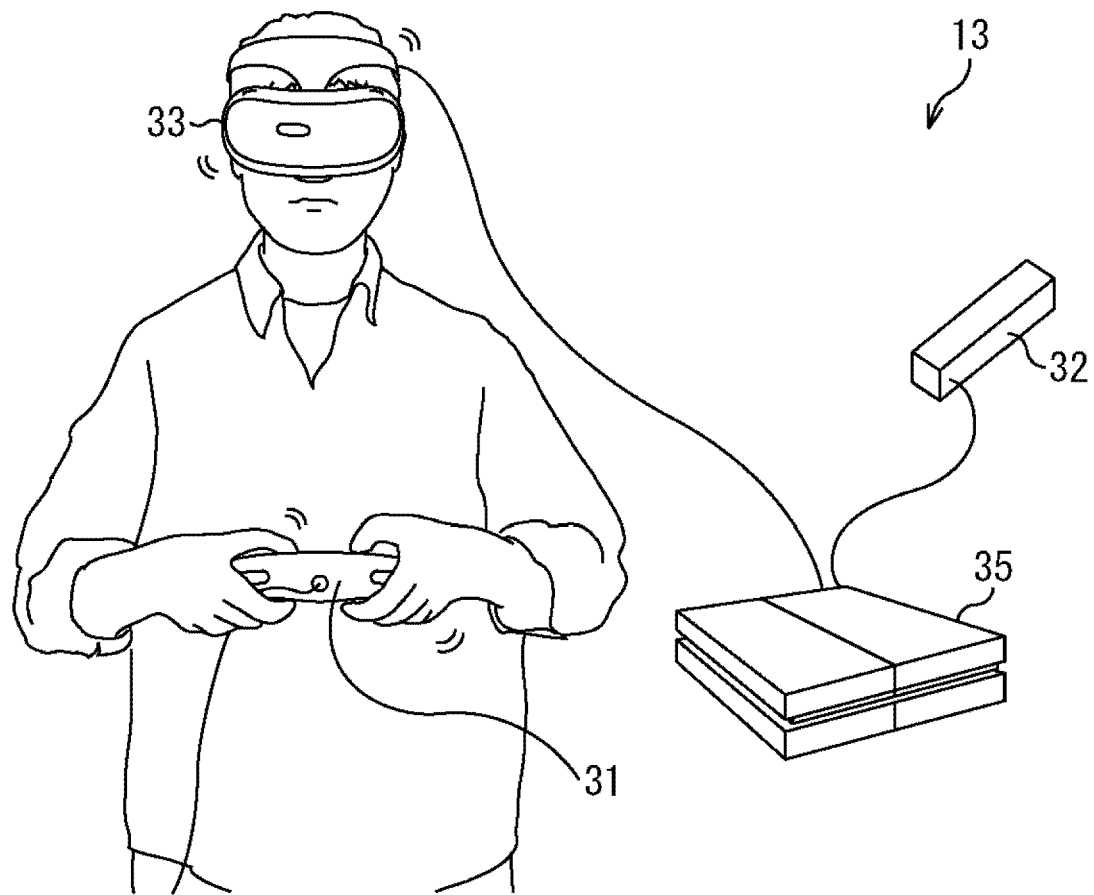
FIG. 11 is a diagram illustrating an example of how a gaming commentator plays a game.

That is, as illustrated in FIG. 11, the commentator side information processing apparatus 13 can be configured by the game system that uses a head mounted display that fixes the display unit 33 in front of the eyes of the commentator so as to allow the imaging unit 32 to image the commentator operating the operation unit 31. In such a game system, a stationary game machine is used as the gaming commentary processing unit 35, and the gaming commentary processing unit 35 executes the game in accordance with the operation by the commentator toward the operation unit 31. Then, the gaming commentary processing unit 35 generates the game screen 22 in which the view is rendered in accordance with the motion of the head of the commentator, and displays the game screen 22 on the display unit 33. Furthermore, the gaming commentary processing unit 35 can use the computer graphics to generate an avatar reflecting the state of the commentator captured by the imaging unit 32 and can display it on the commentator screen 23.

In a game system using such a head mounted display, for example, it is allowable to cause an avatar of the commentator generated from an image captured by the imaging unit 32 to appear in the game, and cause the commentator to perform operation toward the avatar, onto the operation unit 31. Then, the effect rendering unit 55 may perform image processing of adding an effect (for example, an image indicating suffer from damage) based on the play state of the game to the avatar displayed on the distribution gaming commentary video 21.

For example, while a player of a game using a head mounted display can generally experience a strong immersive feeling in the game, it is difficult to enable a viewer of the situation to experience the same degree of immersive feeling as felt by the player. In contrast, the video distribution system 11 can deliver the distribution gaming commentary video 21 in which the effect based on the play state of the game is added to the avatar, making it possible to convey the experience of the commentator to the viewer in a more comprehensible manner even in a game using a head mounted display.

Furthermore, the video distribution system 11 makes it possible to use the game screen 22 of the game executed in an arcade game machine installed in an amusement arcade without executing the game in the commentator side information processing apparatus 13. For example, when the commentator reads the game screen 22 of an already played game from the arcade game machine and distributes while reproducing the game screen 22, it is possible to makes commentary on the state of playing the game. Then, in such a gaming commentary, it is possible to generate and distribute the distribution gaming commentary video 21 in which the effect-attached commentator has been combined over a portion of the game screen 22. In addition, for example, it is allowable with the video distribution system 11 to make commentary onto the game played by another player in addition to making commentary for the game played by the commentator oneself.

Note that the processing described with reference to the above-described flowcharts need not necessarily be processed in chronological order described as a flowchart, and may include processing executed in parallel or individually (e.g., parallel processing or processing by object). Moreover, the program may be processed by one CPU, or may be processed distributively by a plurality of CPUs.

Moreover, the above-described series of processing (information processing method) can be executed by hardware or by software. In a case where the series of processing is executed by software, a program constituting the software is installed from a program recording medium storing the program into a computer incorporated in dedicated hardware, or into a general-purpose computer and the like, for example, capable of executing various functions by installing various programs.

Figure 12:
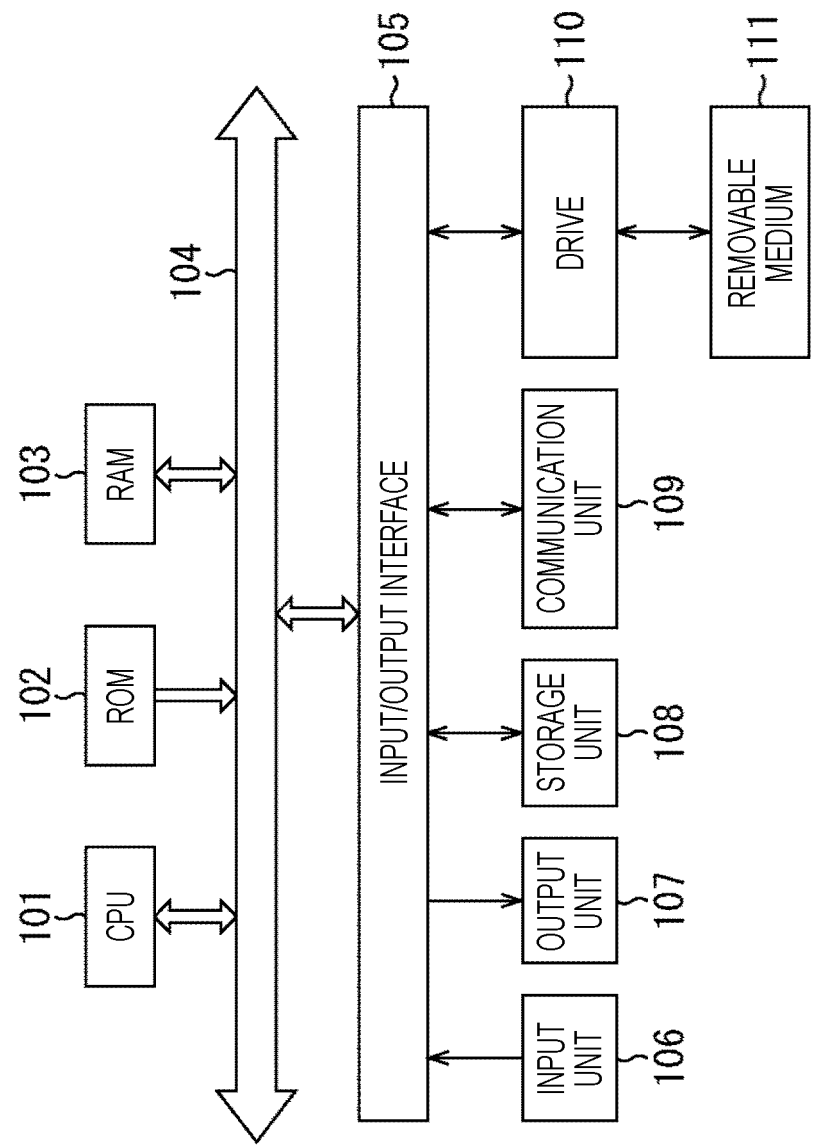
FIG. 12 is a block diagram illustrating an exemplary configuration of a computer according to an embodiment of the present technology.

FIG. 12 is a block diagram illustrating an exemplary configuration of hardware of a computer in which the series of processing described above is executed by a program.

In the computer, a central processing unit (CPU) 101, a read only memory (ROM) 102, a random access memory (RAM) 103 are interconnected with each other via a bus 104.

The bus 104 is further connected with an input/output interface 105. The input/output interface 105 is connected with an input unit 106 including a keyboard, a mouse, a microphone or the like, an output unit 107 including a display, a speaker or the like, a storage unit 108 including a hard disk, a nonvolatile memory or the like, a communication unit 109 including a network interface or the like, and a drive 110 configured to drive a removable medium 111 such as a magnetic disk, an optical disk, a magneto-optical disk, and a semiconductor memory.

On the computer configured as above, the series of above-described processing is executed by operation such that the CPU 101 loads, for example, a program stored in the storage unit 108 onto the RAM 103 via the input/output interface 105 and the bus 104 and executes the program.

The program executed by the computer (CPU 101) is, for example, provided as a program recorded on the removable medium 111 which is a package medium such as a magnetic disk (including a flexible disk), an optical disk (including a compact disc-read only memory (CD-ROM) and a digital versatile disc (DVD)), a magneto-optical disk, or a semiconductor memory, or provided via a wired or wireless transmission medium such as a local area network, the Internet, and digital satellite broadcast.

Then, the program can be installed in the storage unit 108 via the input/output interface 105, by attaching the removable medium 111 to the drive 110. In addition, the program can be received at the communication unit 109 via a wired or wireless transmission medium and be installed in the storage unit 108. Alternatively, the program can be installed in the ROM 102 or the storage unit 108 beforehand.

Note that the present technology may also be configured as follows.

(1)

An information processing apparatus including:

a play state recognition unit that recognizes a play state of a game; and an effect rendering unit that performs image processing of adding an effect to an image representing a state of a commentator that makes a gaming commentary of the game, on the basis of the play state of the game recognized by the play state recognition unit.

(2)

The information processing apparatus according to (1), in which the play state recognition unit recognizes the play state of the game in accordance with an analysis result of analyzing the game screen of the game.

(3)

The information processing apparatus according to (1) or (2), in which the play state recognition unit analyzes a game status indicating predetermined information in accordance with the play state of the game displayed at a predetermined location on the game screen of the game so as to recognize the play state of the game.

(4)

The information processing apparatus according to (3), in which the play state recognition unit analyzes an image representing a parameter of a character in the game displayed as the game status so as to recognize the play state of the game.

(5)

The information processing apparatus according to any of (1) to (4), in which the play state recognition unit recognizes damage suffered by a character in the game as the play state of the game, and the effect rendering unit performs image processing of adding an effect indicating a state where the commentator is damaged in accordance with the damage suffered by the character in the game.

(6)

The information processing apparatus according to (3), in which the play state recognition unit analyzes an image representing a timing of operation with progress of the game displayed as the game status so as to recognize the play state of the game.

(7)

The information processing apparatus according to (3), in which the play state recognition unit analyzes an image representing time or ranking in the game displayed as the game status so as to recognize the play state of the game.

(8)

The information processing apparatus according to (3), in which the play state recognition unit analyzes an image or color representing value of an acquired item in the game displayed as the game status so as to recognize the play state of the game.

(9)

The information processing apparatus according to any of (1) to (8), in which game information associated with play content of the game during commentary is output from a game execution unit that executes the game, and the play state recognition unit recognizes the play state of the game using the game information.

(10)

The information processing apparatus according to any of (1) to (9), further including a distribution video generation unit that generates a distribution video in which the commentator to which an effect has been added by the effect rendering unit is combined over a portion of the game screen of the game.

(11)

The information processing apparatus according to (10), in which the distribution video displays on its entire space the game screen of the game, and a commentator screen that displays an image representing the state of the commentator over a portion of the game screen.

(12)

The information processing apparatus according to any of (1) to (11), in which the commentator makes a gaming commentary of the game in real time while playing the game.

(13)

The information processing apparatus according to any of (1) to (11), in which the commentator makes a gaming commentary of the game while reproducing the game screen of the already played game.

(14)

An information processing method including steps of:

recognizing a play state of a game; and performing image processing of adding an effect to an image representing a state of the commentator on the basis of the recognized play state of the game.

(15)

A program that causes a computer to execute processing including steps of:

recognizing a play state of a game; and performing image processing of adding an effect to an image representing a state of the commentator on the basis of the recognized play state of the game.

Note that the present embodiment is not limited to the above-described embodiments but can be modified in a variety of ways within a scope of the present disclosure.

REFERENCE SIGNS LIST

11 Video distribution system
12 Network
13 Commentator side information processing apparatus
14 Distribution server
15 Viewer side information processing apparatus
21 Distribution gaming commentary video
22 Game screen
23 Commentator screen
24 Game status
31 Operation unit
32 Imaging unit
33 Display unit
34 Communication unit
35 Gaming commentary processing unit
41 Game execution unit
42 Commentator screen generation unit
43 Combining processing unit
51 Video acquisition unit
52 Game information acquisition unit
53 Play state recognition unit
54 Storage unit
55 Effect rendering unit
56 Distribution video generation unit

The invention claimed is:

1. An information processing apparatus comprising:
a video acquisition unit configured to obtain an image representing a commentator that makes a gaming commentary of a game, and another image representing another commentator that makes another gaming commentary of the game;
a play state recognition unit configured to
recognize, based on image analysis of the game and a total count of a game status of the commentator, a play state of the game of the commentator during the gaming commentary, and
recognize, based on image analysis of the game and a total count of a game status of the another commentator, a play state of the game of the another commentator during the another gaming commentary; and
an effect rendering unit configured to perform image processing of adding an image effect to the image representing the commentator and the another image representing the another commentator, based on a comparison between the play state of the game of the commentator and the play state of the game of the another commentator,
wherein the video acquisition unit, the play state recognition unit, and the effect rendering unit are each implemented via at least one processor.

2. The information processing apparatus according to claim 1,
wherein the play state recognition unit is further configured to recognize the play state of the game in accordance with an analysis result of analyzing a game screen of the game.

3. The information processing apparatus according to claim 2,
wherein the game status is displayed at a predetermined location on the game screen of the game so as to recognize the play state of the game.

4. The information processing apparatus according to claim 3,
wherein the play state recognition unit is further configured to analyze an image representing a parameter of a character in the game displayed as the game status so as to recognize the play state of the game.

5. The information processing apparatus according to claim 4,
wherein the play state recognition unit is further configured to recognize damage suffered by a character in the game as the play state of the game, and
the effect rendering unit is further configured to perform image processing of adding an effect indicating a state where the commentator is damaged in accordance with the damage suffered by the character in the game.

6. The information processing apparatus according to claim 3,
wherein the play state recognition unit is further configured to analyze an image representing a timing of operation with progress of the game displayed as the game status so as to recognize the play state of the game.

7. The information processing apparatus according to claim 3,
wherein the play state recognition unit is further configured to analyze an image representing time or ranking in the game displayed as the game status so as to recognize the play state of the game.

8. The information processing apparatus according to claim 3,
wherein the play state recognition unit is further configured to analyze an image or color representing value of an acquired item in the game displayed as the game status so as to recognize the play state of the game.

9. The information processing apparatus according to claim 1,
wherein game information associated with play content of the game during commentary is output from a game execution unit that executes the game, and
the play state recognition unit is further configured to recognize the play state of the game using the game information.

10. The information processing apparatus according to claim 1, further comprising
a distribution video generation unit configured to generate a distribution video in which the commentator to which an effect has been added by the effect rendering unit is combined over a portion of a game screen of the game,
wherein the distribution video generation unit is implemented via at least one processor.

11. The information processing apparatus according to claim 10,
wherein the distribution video displays on its entire space the game screen of the game, and displays a commentator screen that displays an image representing the commentator over a portion of the game screen.

12. The information processing apparatus according to claim 1,
wherein the commentator makes a gaming commentary of the game in real time while playing the game.

13. The information processing apparatus according to claim 1,
wherein the commentator makes a gaming commentary of the game while reproducing a game screen of the already played game.

14. The information processing apparatus according to claim 1, wherein the total count of the game status is measured in accordance with the play state of the game based on a consecutive number of times in which the operation of the commentator measured in accordance with progress of the game is performed.

15. An information processing method comprising:
obtaining an image representing a commentator that makes a gaming commentary of a game, and another image representing another commentator that makes another gaming commentary of the game;
recognizing, based on image analysis of the game and a total count of a game status of the commentator, a play state of the game of the commentator during the gaming commentary;
recognizing, based on image analysis of the game and a total count of a game status of the another commentator, a play state of the game of the another commentator during the another gaming commentary; and
performing image processing of adding an image effect to the image representing the commentator and the image representing the another commentator, based on a comparison between the recognized play state of the game of the commentator and the play state of the game of the another commentator.

16. A non-transitory computer-readable medium having embodied thereon a program, which when executed by a computer causes the computer to execute an information processing method, the method comprising:
obtaining an image representing a commentator that makes a gaming commentary of a game, and another image representing another commentator that makes another gaming commentary of the game;
recognizing, based on image analysis of the game and a total count of a game status of the commentator, a play state of the game of the commentator during the gaming commentary;
recognizing, based on image analysis of the game and a total count of a game status of the another commentator, a play state of the game of the another commentator during the another gaming commentary; and
performing image processing of adding an image effect to the image representing the commentator and the image representing the another commentator, based on a comparison between the recognized play state of the game of the commentator and the play state of the game of the another commentator.

* * * * *